(12) United States Patent
Green

(10) Patent No.: US 10,795,147 B1
(45) Date of Patent: Oct. 6, 2020

(54) REMOTE DISPLAY AND CONTROL SYSTEM FOR TELESCOPE

(71) Applicant: Richard Green, Genoa City, WI (US)

(72) Inventor: Richard Green, Genoa City, WI (US)

( * ) Notice: Subject to any disclaimer, the term of this patent is extended or adjusted under 35 U.S.C. 154(b) by 0 days.

(21) Appl. No.: 16/379,119

(22) Filed: Apr. 9, 2019

(51) Int. Cl.
*G02B 23/24* (2006.01)
*H04N 13/204* (2018.01)
*G02B 23/16* (2006.01)

(52) U.S. Cl.
CPC ......... *G02B 23/2484* (2013.01); *G02B 23/16* (2013.01); *G02B 23/2407* (2013.01); *H04N 13/204* (2018.05)

(58) Field of Classification Search
CPC ............................ G02B 23/2484; G02B 23/16; G02B 23/2407; H04N 13/204
See application file for complete search history.

(56) References Cited

U.S. PATENT DOCUMENTS

| | | | | |
|---|---|---|---|---|
| 6,456,440 B1* | 9/2002 | Alden | ................... | G02B 23/16 359/643 |
| 2004/0109009 A1* | 6/2004 | Yonezawa | ............... | G06T 15/20 345/632 |
| 2006/0103926 A1* | 5/2006 | Meyers | .................. | G02B 23/16 359/430 |
| 2017/0126984 A1* | 5/2017 | Green | .................. | H04N 13/204 |
| 2019/0285413 A1* | 9/2019 | Hallett | ..................... | G01S 19/00 |

* cited by examiner

*Primary Examiner* — Gevell V Selby
(74) *Attorney, Agent, or Firm* — Jerry D. Haynes; Law Office of Jerry D. Haynes

(57) ABSTRACT

A telescope remote display and control system for viewing objects through a telescope and controlling the telescope remotely includes a wearable display, a manual controller, a camera, an mechanical adjuster, and an integration system, all of which are electrically interconnected. In the preferred embodiment, the camera, mechanical adjuster, and integration system are all attached to a target telescope and tripod assembly, while the wearable display and manual controller are positioned remotely. The integration system operates as the control hub, allowing a user to view images from the telescope with the wearable display by way of signals from the camera and control the positioning of the telescope with the manual controller through manipulation of the mechanical adjuster.

4 Claims, 1 Drawing Sheet

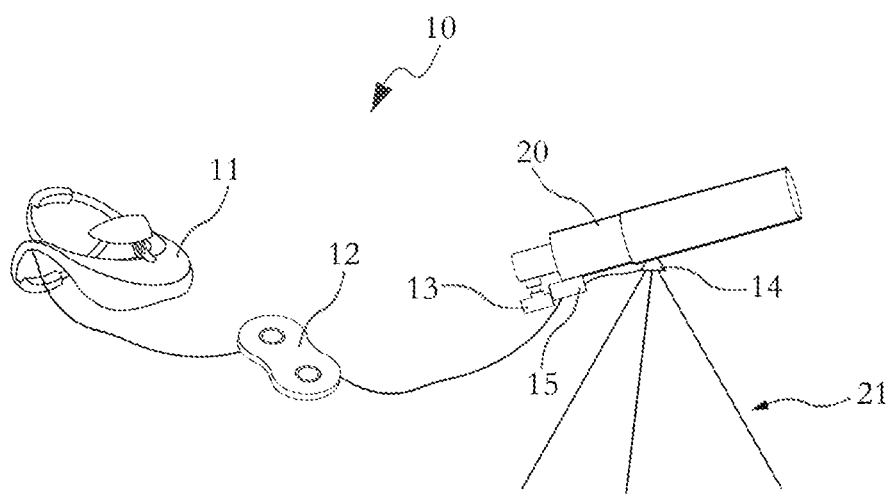

REMOTE DISPLAY AND CONTROL SYSTEM FOR TELESCOPE

BACKGROUND OF THE INVENTION

Field of the Invention

This invention relates generally to optical systems and, more particularly, to a wearable display and remote control system operative with a personal telescope.

Description of the Prior Art

The use of conventional telescopes to view remote settings through the collection of electromagnetic radiation, such as visible light, is well known. Many of such conventional telescopes, particularly those for personal use, require the use of manual adjustment mechanisms to change things like focus and direction when being used to view targeted objects or in targeted directions. In addition, many of such conventional telescopes require a user to position themselves adjacent to the telescope and view through an integrated lens in order to see. Therefore, a problem which still exists, is that with conventional telescopes (again, particularly those for personal, in home use) remote viewing and control capability is not available or at least not feasible to implement from a cost or expertise standpoint. Thus, there remains a need for a remote display and control system for a conventional telescope which would eliminate the need for a user to position themselves adjacent to the telescope to view and adjust it. It would be helpful if such a remote display and control system for a conventional telescope included a head mounted display to allow a user to keep their hands free while viewing objects. It would be additionally desirable for such a remote display and control system for a conventional telescope to employ a stereo camera so as to feed binocular images to the wearable display.

The Applicant's invention described herein provides for a remote display and control system adapted to integrate to a conventional telescope and provide viewing and control features. The primary components in Applicant's remote display and control system are a conventional telescope, a controller, a camera, a wearable display and an integration system. When in operation, the remote display and control system for a conventional telescope enables the modification of a conventional telescope for use by a user positioned remotely relative to the telescope. As a result, many of the limitations imposed by prior art structures are removed.

SUMMARY OF THE INVENTION

A telescope remote display and control system for viewing objects through a telescope and controlling the telescope remotely. The telescope remote display and control system includes a wearable display, a manual controller, a camera, an mechanical adjuster, and an integration system, all of which are electrically interconnected. In the preferred embodiment, the camera, mechanical adjuster, and integration system are all attached to a target telescope and tripod assembly, while the wearable display and manual controller are positioned remotely. The integration system operates as the control hub, allowing a user to view images from the telescope with the wearable display by way of signals from the camera and control the positioning of the telescope with the manual controller through manipulation of the mechanical adjuster.

It is an object of this invention to provide a need for a remote display and control system for a conventional telescope which would eliminate the need for a user to position themselves adjacent to the telescope to view and adjust it.

It is another object of this invention to provide a remote display and control system for a conventional telescope which includes a head mounted display to allow a user to keep their hands free while viewing objects.

It is yet another object of this invention to provide a remote display and control system for a conventional telescope which employs a stereo camera so as to feed binocular images to the wearable display.

These and other objects will be apparent to one of skill in the art.

BRIEF DESCRIPTION OF THE DRAWINGS

FIG. 1 shows the components of a telescope remote display and control system in accordance with the present invention.

DETAILED DESCRIPTION OF THE INVENTION

Referring now to the drawings and in particular FIG. 1, a telescope remote display and control system 10 is shown integrated with a conventional telescope 20, having a wearable display 11, a manual controller 12, a camera 13, an mechanical adjuster 14, and an integration system 15. In the preferred embodiment, the wearable display 11 defines a head mounted display with at least one display screen, the manual controller 12 defines a game controller style manual user interface which can receive directional input from a user that is holding it, the mechanical adjuster 14 defines a motorized pan tilt tripod head which allows for the control of pan and tilt movement of a device (telescope in this case) to be motorized and controlled through a remote control.

It is appreciated that the integration system 15 defines a computer system which includes a processor, memory, and interfaces for the wearable display 11, manual controller 12, camera 13 and mechanical adjuster 14. The memory would include software containing instructions that allow the processor to receive and process inputs from the camera 13 and manual controller 12 and provide usable outputs which relate to such inputs to the wearable display 11 and the mechanical adjuster 14, thereby configuring the integration system to operate the wearable display 11, manual controller 12, camera 13 and mechanical adjuster 14.

In the one embodiment, the camera 13 defines a stereo camera which includes at least two lenses with a separate image sensor or film frame for each lens. In such an embodiment, the lenses would be desirably placed at an intra-ocular distance from one another. In other embodiments, the camera 13 may define a 3D camera which employs a single lens configured to capture three dimensional images (such as cameras which use two LCD screens in the optical path which are used to "black out" their respective half of the lens, sending a slightly different image to the sensor), or a conventional camera which captures a 2 dimensional image In one embodiment, the display screen of the head mounted display defines a single screen which shows live images from the camera 13. In other embodiments, particularly embodiments employing a stereo or 3D capable camera 13, the display defines a discrete screen for each eye, with each screen showing a discreet live image from the camera for each eye.

Shown assembled in FIG. 1, the camera 13 is attached to the lens of the telescope 20 and electrically connected to the integration system 15, which is also attached to the telescope 20. It is contemplated that the camera 13 and integration system 15 may be connected through a wire or any other suitable means to allow the transmission of electrical signals between the two (such as wireless electrical signals). The mechanical adjuster 14 is electrically connected to the integration system 15 through a wire and positioned between the tripod 21 and the telescope 20, thereby enabling it to adjust the relative position of the telescope 20 to the tripod 21. These components together define the telescope assembly.

The manual controller 12 and wearable display 11 may be positioned remotely from the telescope assembly and connected to the integration system through a wire (or other suitable means to allow the transmission of electrical signals therebetween). In this regard, a user can view images from the telescope 20 with the wearable display 11 by way of signals from the camera 13 (through the integration system 15) and control the positioning of the telescope 20 with the manual controller 12 through manipulation of the mechanical adjuster 14. Notably, the manual controller 12 is handheld so a using may easily manipulate the controller 12 and input control commands to the telescope 20. Control buttons shown on the controller 12 may be used to input control commands. The control commands available include zoom in/out, record, track and general movement of the telescope 20 across three axes of movement. Although the manual controller 12 is wired to the telescope other means of connectivity may be used such as Bluetooth or other wireless connectivity.

Further, the wireless connectivity may be implemented between the manual controller 12 and wearable display 11. When operating in this wireless connectivity, images from the telescope 20 are displayed on multiple wearable displays 11 within the display and control system 10, so users may share and view the same image. Further images may be download to storable device.

It is contemplated that the integration system 15, mechanical adjuster 14, camera 13, manual controller 12, and wearable display 11 may all include their own onboard power source, or may share one or more power sources housed therein or in a separate discrete electrical power module.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A remote display and control system for use with a conventional telescope, comprising: a camera having a power source and attachable to a telescope having a lens, wherein said camera is positioned to capture images which define electromagnetic radiation collected by a telescope to which the camera is attached; at least one display apparatus having a power source and positioned remote location relative to said camera and configured to display images captured by said camera, wherein each of the said at least one display apparatus is wearable by an individual user, further where wherein said display apparatus is adapted to show at least two discrete images from images captured by the camera, a motorized mechanical adjuster having a power source and attachable to a telescope having a lens, wherein said mechanical adjuster is positioned to cause a telescope to which the mechanical adjuster is attached to at least one of pan and tilt; and a manual controller having a power source and positioned remote location relative to a telescope to which the mechanical adjuster is attached, wherein said manual controller is configured to generate electrical signals which cause the mechanical adjuster to at least one of pan and tilt the telescope; additionally comprising an integration system having a power source and electrically integrated with said camera, display apparatus, mechanical adjuster and manual controller so as to receive and process inputs from the camera and manual controller and provide usable outputs which relate to said inputs to the wearable display and the mechanical adjuster, thereby connecting electrical signals from the manual controller to the mechanical adjuster and enabling the display apparatus to receive electrical signals from the camera which correspond to images captured by said camera.

2. The remote display and control system of claim 1, wherein said camera defines a stereo camera.

3. A remote display and control system for use with a conventional telescope, comprising: a telescope having a lens and positioned on a discrete frame; a camera having a power source and integral with said telescope and adapted to capture images which define electromagnetic radiation collected by said telescope; a display apparatus having a power source and positioned remote location relative to said camera and configured to display images captured by said camera, wherein said display apparatus is wearable by an individual user, wherein said display apparatus is adapted to show at least two discrete images from images captured by the camera; a motorized mechanical adjuster having a power source and integrated with the telescope and frame, wherein said mechanical adjuster is configured to cause said telescope move relative to said frame; and a manual controller having a power source and positioned remote location relative to the mechanical adjuster, wherein said manual controller is configured to generate electrical signals which cause the mechanical adjuster to move the telescope relative to said frame; additionally comprising an integration system having a power source and electrically integrated with said camera, display apparatus, mechanical adjuster and manual controller so as to receive and process inputs from the camera and manual controller and provide usable outputs which relate to said inputs to the wearable display and the mechanical adjuster, thereby connecting electrical signals from the manual controller to the mechanical adjuster and enabling the display to receive electrical signals from the camera which correspond to images captured by said camera.

4. The remote display and control system of claim 3, wherein said camera defines a stereo camera.

* * * * *